(12) United States Patent
Nishimura et al.

(10) Patent No.: US 6,507,680 B1
(45) Date of Patent: Jan. 14, 2003

(54) PLANAR LIGHTWAVE CIRCUIT MODULE

(75) Inventors: Masayuki Nishimura, Yokohama (JP); Hitoshi Hatayama, Yokohama (JP); Nobuhiro Akasaka, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 70 days.

(21) Appl. No.: 09/637,250

(22) Filed: Aug. 14, 2000

Related U.S. Application Data
(60) Provisional application No. 60/191,458, filed on Mar. 23, 2000.

(30) Foreign Application Priority Data

Sep. 14, 1999 (JP) .......................................... 11-260725

(51) Int. Cl.[7] .............................. G02B 6/12; G02B 6/42
(52) U.S. Cl. .............................. 385/14; 385/50; 385/89; 385/140
(58) Field of Search .............................. 385/14, 47, 50, 385/88, 89, 91, 140

(56) References Cited

U.S. PATENT DOCUMENTS

| | | | | |
|---|---|---|---|---|
| 5,410,622 A | * | 4/1995 | Okada et al. | 385/10 |
| 5,499,309 A | * | 3/1996 | Kozuka et al. | 385/38 |
| 5,966,478 A | | 10/1999 | Marcuse et al. | |
| 6,311,004 B1 | * | 10/2001 | Kenney et al. | 385/130 |
| 6,327,407 B1 | * | 12/2001 | Mitsuda et al. | 385/48 |

FOREIGN PATENT DOCUMENTS

| | | |
|---|---|---|
| JP | 06331837 | 12/1994 |
| JP | 11-153719 | 6/1999 |

* cited by examiner

Primary Examiner—Hemang Sanghavi
Assistant Examiner—Omar Rojas
(74) Attorney, Agent, or Firm—McDermott, Will & Emery

(57) ABSTRACT

A planar lightwave circuit (PLC) of a PLC module is provided with many waveguides including a plurality of input (output) optical waveguide on a substrate. Junction faces between these input (output) optical waveguide and input (output) optical fibers are slant against the optical axis thereof. The PLC module has photodetectors opposed to corresponding junction faces disposed at the input-optical-fiber's-side (output-optical-waveguide's-side).

13 Claims, 11 Drawing Sheets

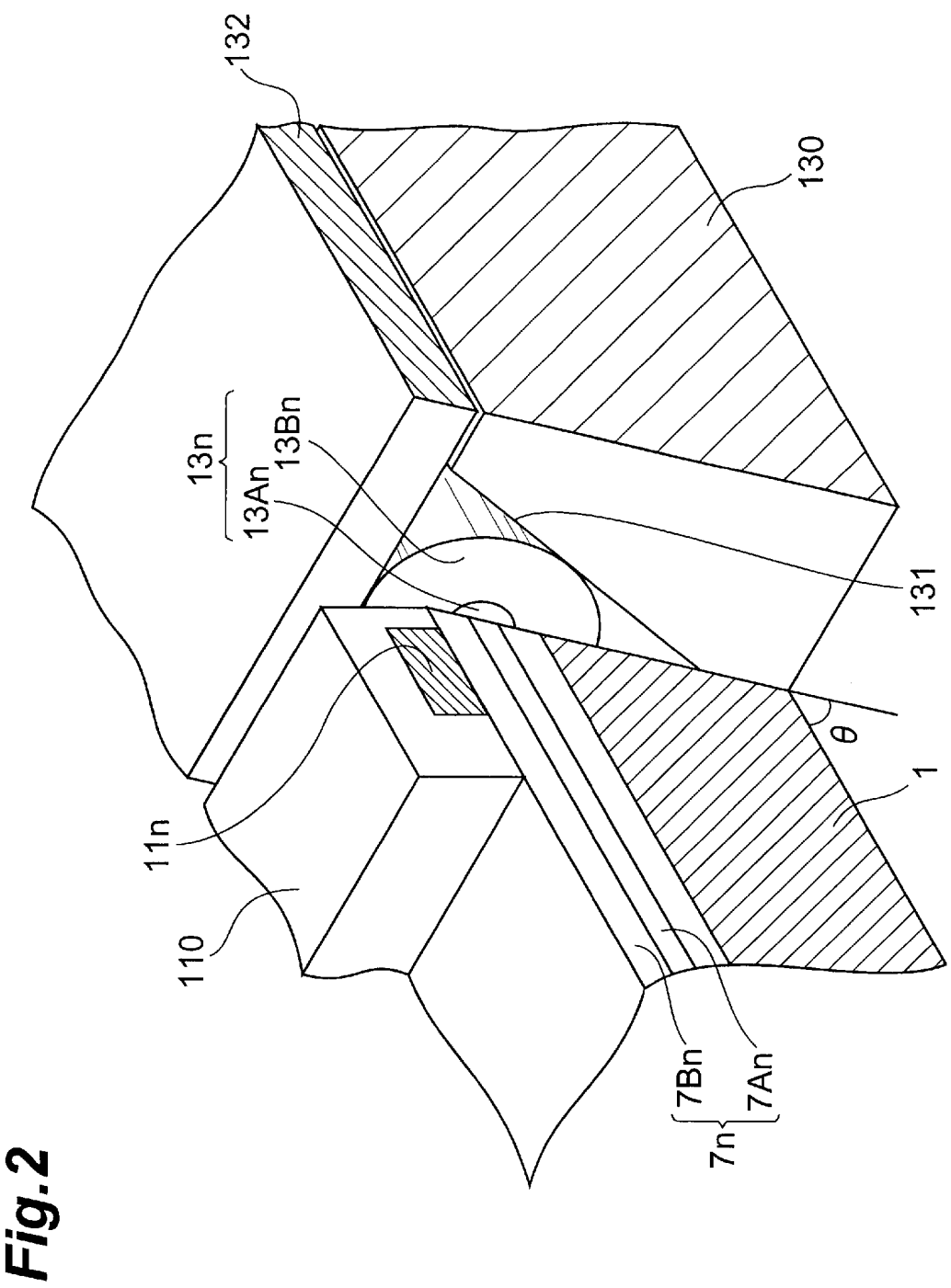

PLANAR LIGHTWAVE CIRCUIT MODULE

RELATED APPLICATIONS

This application claims priority from U.S. Provisional Patent Application Serial No. 60/191,458, filed Mar. 23, 2000, and is incorporated herein by reference.

BACKGROUND OF THE INVENTION

1. Field of the Invention

The present invention relates to a planar lightwave circuit module comprising a planar lightwave circuit provided with a plurality of input ports or a plurality of output ports and having a function of monitoring the powers of multi-channel signal light beams coming incident on the plurality of input ports or emitting from the plurality of output ports.

2. Related Background Art

In a planar lightwave circuit (PLC) having a plurality of input ports or a plurality of output ports, e.g., a multi-channel optical variable attenuator, optical demultiplexer, or optical multiplexer, it becomes necessary to monitor the powers of the signal light beams of respective channels coming incident on the respective input ports or emitting from the respective output ports. Because it is necessary for adjusting the powers of the signal light beams of respective output channels in the optical demultiplexer or adjusting the characteristics of the multiplexed signal light in response to the power of the input signal light beams in the optical multiplexer.

In order to monitor the powers of the signal light beams of the respective channels, a photocoupler is provided to an optical waveguide connected to the input ports or output ports. Part of the signal light beam is branched by the photocoupler to another optical waveguide, and the power of the branched signal light beam is monitored by a photodetector.

For example, a multi-channel optical variable attenuator using a Mach-Zehnder type optical waveguide is a PLC having a plurality of input ports and a plurality of output ports. FIG. 11 is a view showing an arrangement corresponding to one channel of such a conventional multi-channel optical variable attenuator. This one-channel optical variable attenuator has a PLC on a substrate 1, this PLC consists of an input optical waveguide 2, first directional coupler 3, first optical waveguide 4, second optical waveguide 5, second directional coupler 6, output optical waveguide 7, and monitoring optical waveguide 8. And the attenuator has a heater 9 for adjusting the temperature of the first optical waveguide 4 and a photodetector 10 connecting the exit end of the monitoring optical waveguide 8. The multi-channel optical variable attenuator is provided with such configured optical variable attenuators parallel aligned on the substrate 1.

In this optical variable attenuator, a signal light beam input to the input optical waveguide 2 is branched by the directional coupler 3. The branched signal light beams are input to the directional coupler 6 through the optical waveguides 4 and 5, respectively. These signal light beams are output from the directional coupler 6 to the output optical waveguide 7 and monitoring optical waveguide 8 with a predetermined branching ratio. This branching ratio is adjusted by controlling the temperature of the optical waveguide 4 with the heater 9 so as to change the optical path length of the optical waveguide 4. The power of the light beam emitting from the exit end of the monitoring optical waveguide 8 is detected by the photodetector 10, and the temperature of the optical waveguide 4 is controlled by the heater 9. Therefore, the ratio (Pout/Pin) of a power Pout of the signal light beam to be output to the output optical waveguide 7 to a power Pin of the signal light beam input to the input optical waveguide 2, i.e., the optical attenuation amount, can be controlled.

In addition, as a PLC having a plurality of input ports or a plurality of output ports, an AWG (Arrayed Waveguide Grating) used as an optical multiplexer or optical demultiplexer is well known. For example, a reference "General Meeting of Year 1996 of The Institute of Electronics, Information and Communication Engineers, B-1183" describes an arrangement in which photodetectors are connected to ports, in an AWG serving as an optical demultiplexer, that output high-order diffracted light. In this AWG, the powers of the signal light beams of the respective wavelengths demultiplexed by the AWG are monitored on the basis of the detection results of the high-order diffracted light detected by the photodetectors.

SUMMARY OF THE INVENTION

In such conventional PLCS, monitoring optical waveguides must be separately provided in units of output ports. When multi-channel PLCs are integrated, the circuit configuration becomes complicated, and the module size increases. Although the monitoring signal light beam (demultiplexed light or high-order diffracted light) has characteristics which are different to those of the original exit signal light beam, the branching ratio may be fluctuated with the power of the original exit signal light beam. Therefor, the power of the original exit signal light beam cannot sometimes be monitored accurately.

The present invention has been made in order to solve the problems described above, and has as its object to provide a PLC module which can accurately monitor the power of signal light beams of the respective channels with a simple arrangement.

In order to solve the above-mentioned problems, the PLC module according to the present invention comprises (1) a PLC provided with many waveguides including a plurality of output optical waveguides on a substrate, wherein output end faces of the output optical waveguides are slant against the optical axis thereof; (2) an output optical fiber array including output optical fibers each coupled to corresponding output optical waveguide; and (3) photodetector array including photodetectors each located on the surface of the PLC and opposed to the corresponding junction between the output optical waveguide and output optical fiber.

Alternatively, the PLC module according to the present invention may comprise (1) a PLC provided with many waveguides including a plurality of input optical waveguides on a substrate, wherein input end faces of the input optical waveguides are slant against the optical axis thereof; (2) an optical fiber array including input optical fibers each coupled to the corresponding input optical waveguide; and (3) a photodetector array including photodetectors each located on the input optical fiber array and opposed to the corresponding junction between the input optical waveguide and input optical fiber.

In these PLC modules, a junction face between the input optical fiber and the input optical waveguide or between the output optical fiber and the output optical waveguide is slant against their optical axes, so that a part of signal light is reflected at this junction face. The reflected light is detected by a corresponding photodetector arranged in the photodetector array which is opposed to the junction face. As a consequence, power of the signal light can be accurately measured with a simple arrangement.

An angle between the junction face and the optical axis thereof is preferable within a range of 45 to 70 degrees, whereby the photodetectors can be located whereby the photodetectors can be displaced from a point directly above the junction faces, thus achieving a simple arrangement. Further, a distance between the junction face and the photodetector can be enlarged by providing the surface of the optical waveguide with a light-transmitting resin layer and arranging the photodetector on the resin layer. Therefore, the photodetector can be displaced, to an extent of the enlarged distance, toward the center of the substrate of the PLC from the point directly above the junction face, thus preferably achieving a simple arrangement.

A reflecting film may be disposed at the junction of the waveguides and the optical fibers, and the reflecting film is preferably a dielectric multi-layer film. Therefore, the reflected ratio at the junction can be kept constant and power of the signal light can be accurately measured with a simple arrangement.

The present invention can be suitably applied to a PLC comprising a multi-channel optical variable attenuator, an optical demultiplexer or an optical multiplexer. For example, in the application to the multi-channel optical variable atttenuator, power of light of each channel can be monitored so as to control power or attenuation of light emitted from each channel. Further, in the application to the optical demultiplexer or the optical multiplexer, light of each demultiplexed or mupltiplexed wavelenth can be monitored. It is natural that the present invention can be applied to a system comprising the multi-channel optical variable attenuator, the optical demultiplexer and the optical multiplexer.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 2 is an exploded perspective view showing a portion in vicinity of an output port of the PLC module shown in FIG. 1;

DESCRIPTION OF THE PREFERRED EMBODIMENTS

Figure 1:
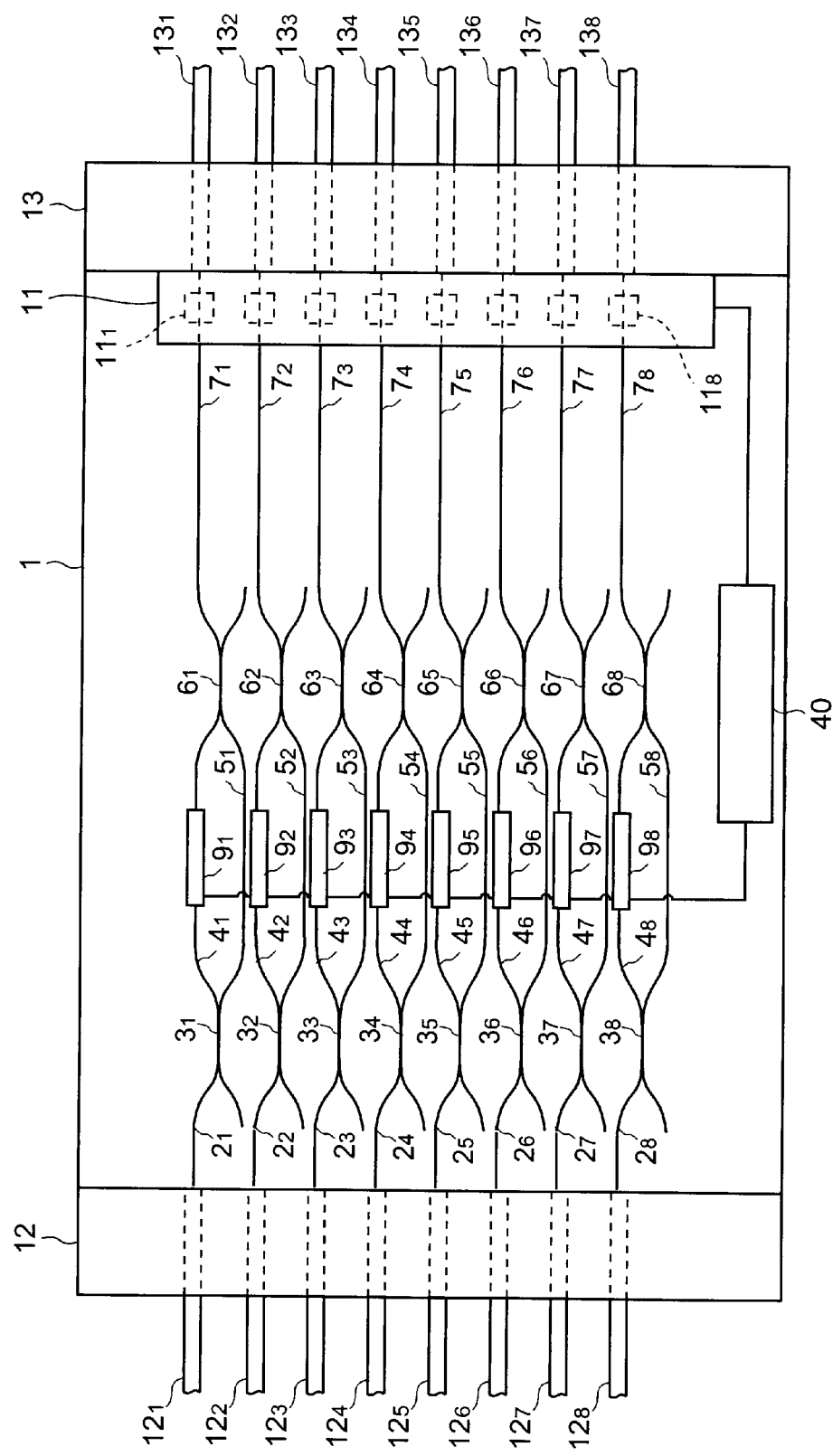
FIG. 1 is a plan view of a PLC module of the first embodiment according to the present invention.

The preferred embodiments of the present invention will be described in detail with reference to the accompanying drawings. To facilitate the comprehension of the explanation, the same reference numerals denote the same parts, where possible, throughout the drawings, and a repeated explanation will be omitted.

(First Embodiment)

FIG. 1 is a plan view of a PLC module of the first embodiment according to the present invention.

This PLC module has eight Mach-Zehnder type optical variable attenuators parallel aligned on a common substrate 1, and has a function of an 8-channel optical variable attenuator. Each optical variable attenuator (n=1 to 8) consists of an input optical waveguide $2_n$, a first directional coupler $3_n$, a first optical waveguide $4_n$, a second optical waveguide $5_n$, a second directional coupler $6_n$, an output optical waveguide $7_n$, and heater $9_n$. The first and second optical waveguides $4_n$ and $5_n$ are parallel connected between the first and second directional coupler $3_n$ and $6_n$ which are inserted between input and output optical waveguide $2_n$ and $7_n$ in series. The heater $9_n$ is disposed on the first optical waveguide $4_n$.

This PLC module also has a photodetector array 11 having arranged eight photodetectors $11_1$ to $11_8$, an input optical fiber array 12 having arranged eight input optical fibers $12_1$ to $12_8$, and output optical fiber array 13 having arranged eight output optical fibers $13_1$ to $13_8$. Further, a control circuit 40 is connected to photodetectors $11_1$ to $11_8$ and heaters $9_1$ to $9_8$. (Details of connected signal lines are omitted in the drawings.)

FIG. 2 is a perspective view showing a portion (output port portion) in vicinity of a junction portion between output optical waveguide $7_n$ and output optical fiber $13_n$ of one channel in the PLC module. As shown in FIG. 2, the output optical waveguide $7_n$ of the PLC has core 7A and cladding 7B formed on the substrate 1. The output optical fiber $13_n$ also has core 13A and cladding 13B. The output optical fiber $13_n$ is accommodated in V-groove 131 formed in base 130 of optical fiber array 13. The output optical fiber $13_n$ is secured in respective V-groove 131 by pushing down the plate 132 toward the V-grooves 131. Here, the end face of output optical waveguide $7_n$ and the end face of output optical fiber $13_n$ are polished to form a certain slant angle θ with their respective optical axes. Then, the end faces of output optical waveguide $7_n$ and output optical fiber $13_n$ are jointed in such a manner that the optical axes of output optical waveguide $7_n$ and output optical fiber $13_n$ lie on one straight line. The angle θ between the end face and the optical axis of output optical waveguide $7_n$ as well as output optical fiber $13_n$ is preferably within a range of 70 to 45 degrees.

In addition, the n-th photodetector $11_n$ in photodetector array 11 is disposed above output optical waveguide $7_n$ and at a position very close to the junction face between output optical waveguide $7_n$ and output optical fiber $13_n$. The photodetector $11_n$ is fixed on output optical waveguide $7_n$ via resin layer 110. Due to the setting of the foregoing angle θ, a part of light propagated from output optical waveguide $7_n$ is reflected by the junction face between output optical waveguide $7_n$ and output optical fiber $13_n$. The photodetector $11_n$ needs to be located at a position capable of receiving the light thus reflected. As the photodetector $11_n$, for example, a photodiode is suitably used. The reflectance of the exit light beam at the junction face is preferably about 3% to 20%.

The PLC module of this embodiment operates in the following manner. A signal light beam input to the input optical waveguide $2_n$ from the input optical fiber $12_n$ is branched by the directional coupler $3_n$. The branched signal light beams are input to the directional couplers $6_n$ through the optical waveguides $4_n$ and $5_n$, respectively. The composite signal light beam is output from the directional coupler $6_n$ to the output optical waveguides $7_n$. Here, the power of the composite signal light beam is adjusted by the controlling the optical path length of the optical waveguides $4_n$ by way of changing the temperature with heater $9_n$. The signal light beams output to the output optical waveguides $7_n$ are reflected by the junction face (output end faces of the output optical waveguides $7_n$) at a constant reflectance toward the photodetectors $11_n$, and their powers are detected by the photodetectors $11_n$. The signal light beams transmitted through the end faces of the output optical waveguides $7_n$ come incident on the output optical fibers $13_n$.

The control circuit 40 controls the powers of the signal light beams that have reached and detected by the photodetectors $11_n$ by adjusting the temperatures, i.e., the optical path lengths, of the optical waveguides $4_n$ with the heaters $9_n$. Therefore, the ratio (Pout/Pin) of a power Pout of the signal light beam to be output to the output optical waveguide $7_n$ to a power Pin of a signal light beam input to the input optical waveguide $2_n$, i.e., the optical attenuation amount, can be controlled, or the power Pout of the signal light beam to be output to the output optical waveguide $7_n$ can be controlled. Also, the powers of the signal light beams to be respectively output from the output optical waveguides $7_n$ to the output optical fibers $13_n$ (n=1 to 8) can be set equal to each other.

As described above, in the PLC module according to this embodiment, monitoring optical waveguides need not be separately provided in units of output ports. Even when multi-channel PLCs are integrated, the circuit configuration is simple, and the module size is small. Since the reflectance at the junction face has almost constant value, the power of the exit light beam can be accurately monitored.

Figure 3A:
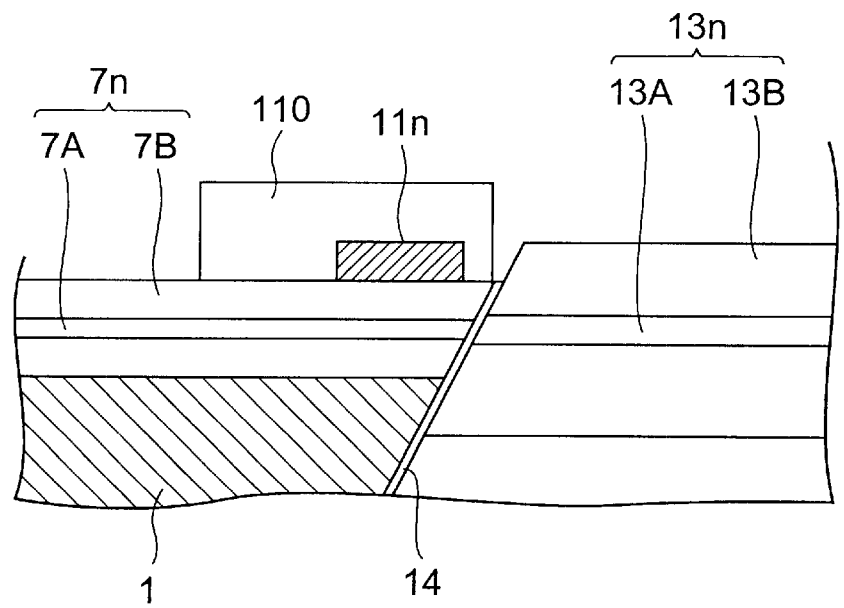
FIGS. 3A and 3B are cross section views showing modified embodiments wherein the connection end face of the output port in the PLC module shown in FIG. 1 is provided with a reflecting film.
Figure 3B:
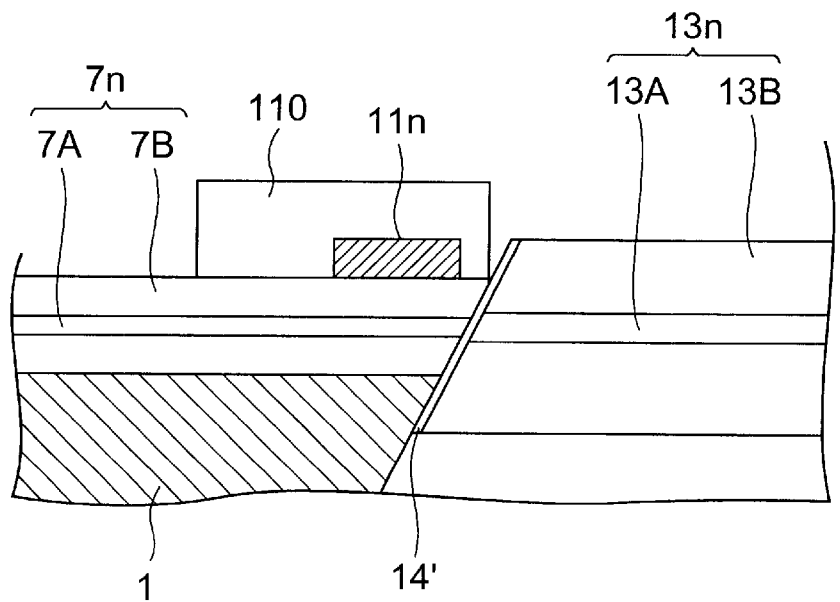

Here, the reflectance is preferably, as described above, about 3% to 20%. In order to keep a desirable state of the reflection characteristic, reflecting film 14 is preferably disposed on the end face of output optical waveguide $7_n$, as shown in FIG. 3A, in which (and other drawings that will be referred to hereinafter) the portions having no relation to the explanation are omitted. Reflecting film 14 is preferably a dielectric multi-layer film that can be easily manufactured corresponding to desired reflection characteristic. Alternatively, reflecting film 14' may also be disposed on the end face of output optical fiber $13_n$, as shown in FIG. 3B. Reflecting film 14' is also preferably a dielectric multi-layer film.

When photodetector $11_n$ is placed directly on cladding 7B of output optical waveguide $7_n$, as shown in FIG. 2, a light-receiving portion of photodetetor $11_n$ needs to be arranged close to the junction face, and therefore it may come into contact with output optical fiber $13_n$ when placing and fixing photodetector $11_n$, thus causing deterioration in the connection efficiency between output optical waveguide $7_n$ and output optical fiber $13_n$.

Figure 4:
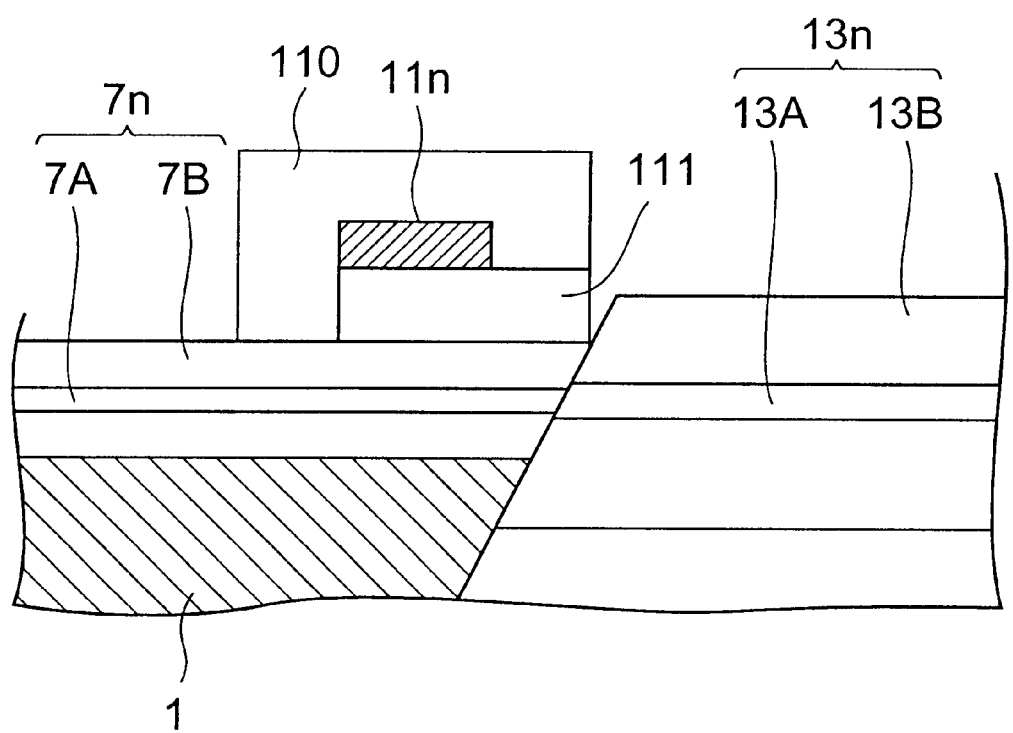
FIG. 4 is a cross section view showing another arrangement of the optical detector in the PLC module shown in FIG. 1.

Therefore, in the embodiment shown in FIG. 4, transparent resin layer 111 is provided on cladding 7B of output optical waveguide $7_n$, and photodetector $11_n$ is placed on resin layer 111. As a consequence, the light-receiving portion of photodetector $11_n$ is isolated from the junction face between output optical waveguide $7_n$ and output optical fiber $13_n$, thus attaining a simpler arrangement of photodetector $11_n$ while effectively preventing the connection efficiency from lowering. Transparent resin layer 111 has preferably the same refractive index as cladding 7B.

(Second Embodiment)

Figure 5:
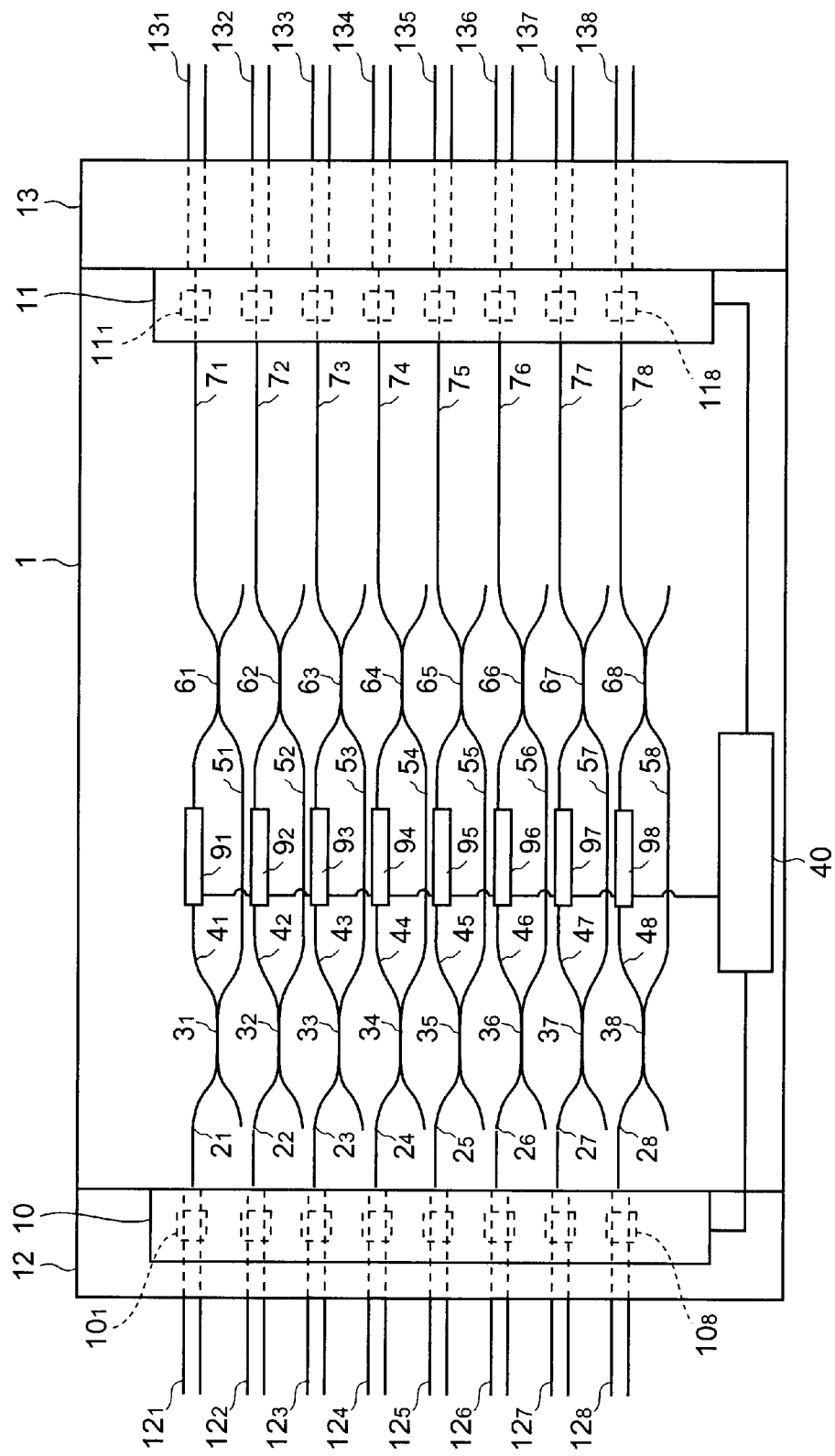
FIG. 5 is a plan view of a PLC module of the second embodiment according to the present invention.

FIG. 5 is a plan view of a PLC module of the second embodiment according to the present invention.

This PLC module has an 8-channel optical variable attenuator, having a similar arrangement to that of the first embodiment, as a PLC. This PLC module also has two photodetector arrays 10 and 11 each having arranged eight photodetectors $10_1$ to $10_8$ or $11_1$ to $11_8$, an input optical fiber array 12 having arranged eight input optical fibers $12_1$ to $12_8$, and an output optical fiber array 13 having arranged eight output optical fibers $13_1$ to $13_8$. The controlling circuit 40 is connected to photodetectors $10_1$ to $10_8$ and $11_1$ to $11_8$ and heaters $9_1$ to $9_8$.

Figure 6:
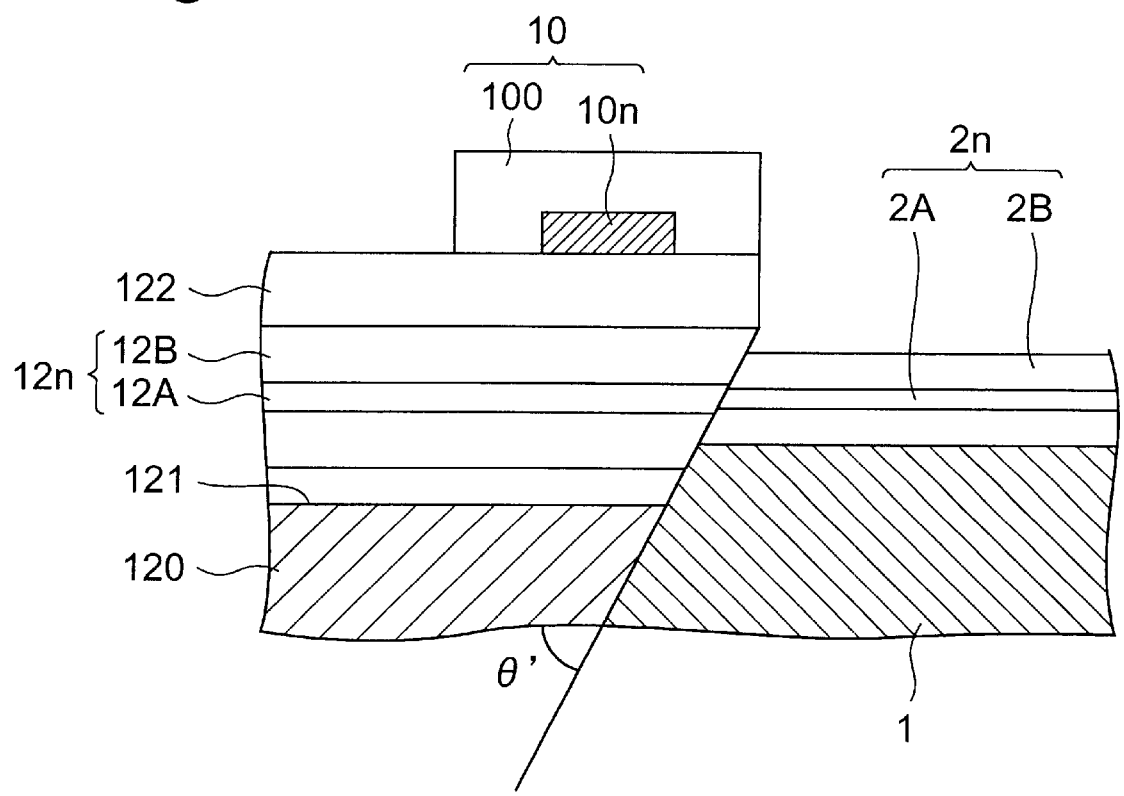
FIG. 6 is a sectional view taken near the input ports of the PLC module shown in FIG. 5.

This PLC module has a different input ports arrangement from the PLC module of the first embodiment. FIG. 6 is a sectional view taken near the input ports of the PLC module of the second embodiment. The structure shown as FIG. 4 is similar to the structure in vicinity of the output port of the PLC module in the first embodiment shown in FIG. 2. Specifically, the input optical waveguide $2_n$ of the PLC has core 2A and cladding 2B formed on the substrate 1. The input optical fiber $12_n$ also has core 12A and cladding 12B. The input optical fiber $12_n$ is accommodated in V-groove 121 formed in base 120 of optical fiber array 12. The input optical fiber $12_n$ is secured in respective V-groove 121 by pushing down the transparent plate 122 toward the V-grooves 121. Here, the end face of input optical waveguide $2_n$ and the end face of input optical fiber $12_n$ are polished to form a certain slant angle θ' with their respective optical axes. Then, the end faces of input optical waveguide $2_n$ and input optical fiber $12_n$ are jointed in such a manner that the optical axes of input optical waveguide $2_n$ and input optical fiber $12_n$ lie on one straight line. The angle θ' between the end face and the optical axis of input optical waveguide $2_n$ as well as input optical fiber $12_n$ is preferably within a range of 70 to 45 degrees.

The n-th photodetector $10_n$ in photodetector array 10 is disposed above input optical fiber $12_n$ and at a position very close to the junction face between input optical waveguide $2_n$ and input optical fiber $12_n$. The photodetector $10_n$ is fixed on input optical fiber $12_n$ via resin layer 100. Due to the setting of the foregoing angle θ', a part of light propagated from input optical fiber $12_n$ is reflected by the junction face between input optical fiber $12_n$ and input optical waveguide $2_n$. The photodetector $10_n$ needs to be located at a position capable of receiving the light thus reflected. As the photodetector $10_n$, for example, a photodiode is suitably used. The reflectance of the exit light beam at the junction face is preferably about 3% to 20%. For achieving this reflectance value the reflecting film is preferably disposed on the end face of input optical fiber $12_n$ or waveguide $2_n$, as shown in FIG. 3A or 3B. The reflecting film may be a dielectric multi-layer film.

This PLC module operates in similar manner to the first embodiment. A signal light beam propagated through the input optical fiber $12_n$ is partly reflected by the junction face between the input optical waveguide $2_n$ at constant ratio. Thus reflected light beam passes through the plate 122 and reaches the photodetector $10_n$, and its power is detected by the photodetector $10_n$. The signal light beam transmitted through the junction face and passes through the input optical waveguide $2_n$.

According to this embodiment, the powers of the input and output signal light beams can be accurately monitered. Therefore, the ratio (Pout/Pin) of a power Pout of the signal light beam to be output to the output optical waveguide $7_n$ to a power Pin of the signal light beam input to the input optical waveguide $2_n$, i.e., the optical attenuation amount, can be controlled, or the power Pout of the signal light beam to be output to the output optical waveguide $7_n$ can be controlled. Also, the powers of the signal light beams to be respectively output from the output optical waveguides $7_n$ to the output optical fibers $13_n$ (n=1 to 8) can be set equal to each other.

As described above, in the PLC module according to this embodiment has same advantages as the first embodiment.

The photodetector $10_n$ may be disposed below transparent plate 122, namely in contact with cladding 12B of optical fiber $12_n$, and may also be disposed with an interposed transparent resin layer, similar to the structure shown in FIG. 4.

(Third Embodiment)

Figure 7:
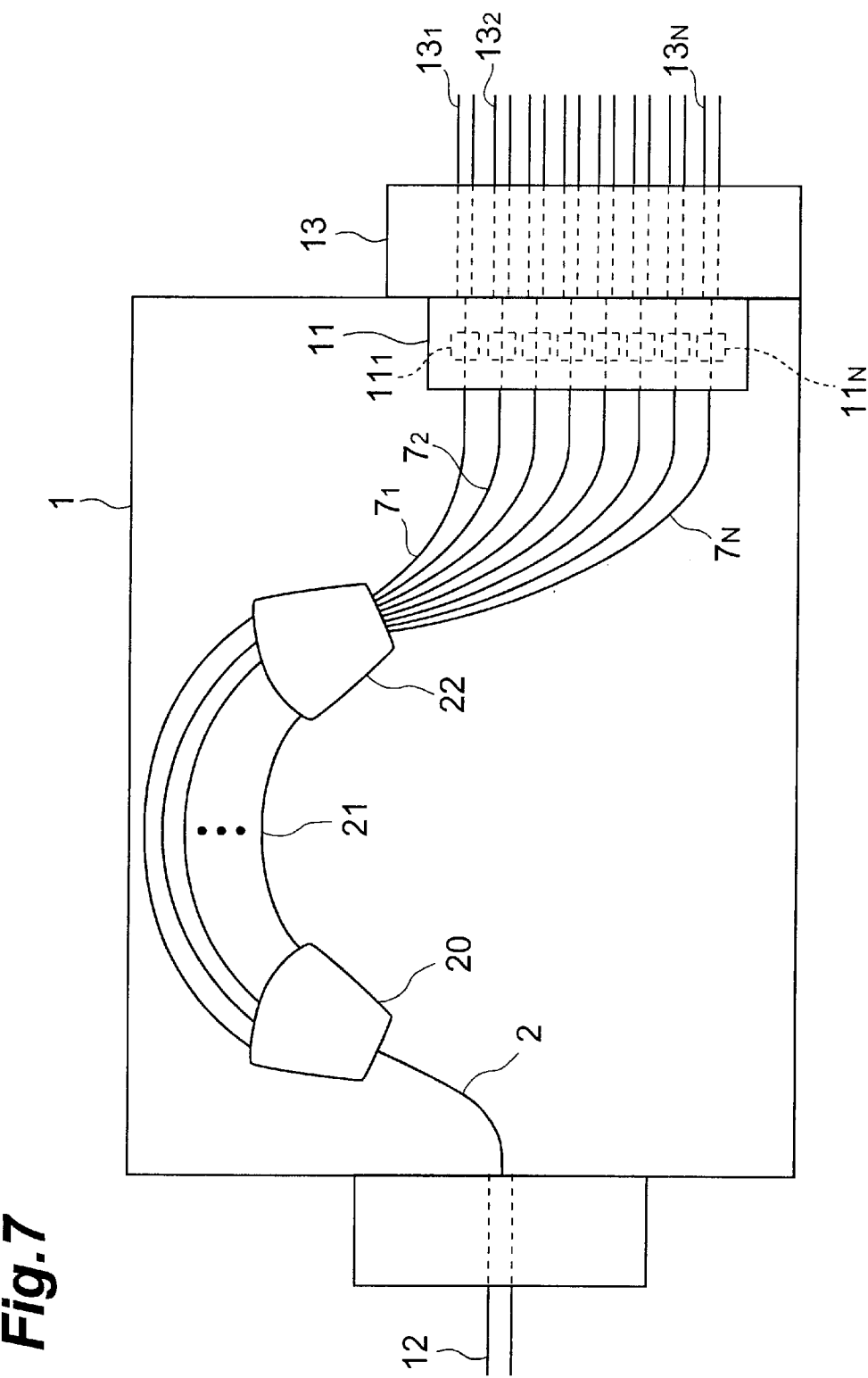
FIGS. 7 to 10 are respective plan views of PLC modules of the third to sixth embodiment according to the present invention.

FIG. 7 is a plan view of the PLC module of the third embodiment according to the present invention.

This PLC module has an AWG, serving as an optical demultiplexer, as a PLC. This PLC consists of an input optical waveguide 2, a slab waveguide 20, an array waveguide portion 21, a slab waveguide 22, and output optical waveguides $7_1$ to $7_N$ on a substrate 1, and has one input port and N output ports. This PLC module further comprises of a photodetector array 11 having N arrayed photodetectors $11_1$ to $11_N$, one input optical fiber 12, and an output optical fiber array 13 having N optical fibers $13_1$ to $13_N$.

The slab waveguide 20 diffracts a signal light beam input from the input optical waveguide 2, and guides it to come incident on a plurality of optical waveguides constituting the array waveguide portion 21. The slab waveguide 22 diffracts signal light beams input from the array waveguide portion 21, and guides them to come incident on the output optical waveguides $7_1$ to $7_N$. The array waveguide portion 21 formed between the slab waveguides 20 and 22 is comprised of the plurality of optical waveguides. These plurality of optical waveguides have optical path lengths that are different from each other by a predetermined value, to phase-shift the light beams being guided in them. The sectional arrangement near the output ports of this PLC module is identical to that shown in FIG. 2.

This PLC module operates in the following manner. A signal light beam input from the input optical fiber 12 to the input optical waveguide 2 is guided in the input optical waveguide 2, and is input to the slab waveguide 20. The signal light beam input to the slab waveguide 20 is guided toward the array waveguide portion 21 while being diffracted. The respective wavelength components of the signal light beam input to the array waveguide portion 21 are guided through all the plurality of optical waveguides of the array waveguide portion 21, and are input to the slab waveguide 22. The respective wavelength components of the signal light beam are guided toward the output optical waveguides $7_1$ to $7_N$ while being diffracted in the slab waveguide 22.

Since the plurality of optical waveguides of the array waveguide portion 21 have optical lengths that are different from each other by the predetermined value, the signal light beams guided in them are phase-shifted in accordance with their wavelengths. When these signal light beams are guided through the array waveguide portion 21 and slab waveguide 22 and come incident on the output optical waveguides $7_n$, signal light beams having a wavelength $\lambda_n$ are strengthened by each other, while signal light beams having another wavelength $\lambda_m$ are canceled by each other (n, m=1 to N and n≠m). Therefore, the signal light beams having the wavelength kn are demultiplexed and output to the output optical waveguides $7_n$.

The signal light beam having the wavelength $\lambda_n$ and output to the optical waveguide $7_n$ is reflected by the junction face. (end face of the optical waveguide $7_n$) at a predetermined reflectance. The beam thus reflected reaches the photodetector $11_n$, and its power is detected by the photodetector $11_n$. The signal light beam transmitted through the junction face comes incident on the output optical fiber $13_n$. More specifically, by detecting the power of the beam thus reflected, the power of the signal light beam of each wavelength to be output from the output optical waveguide $7_n$ to the output optical fiber $13_n$ can be monitored accurately.

As described above, in the PLC module according to this embodiment has same advantages as the first and second embodiment.

(Fourth Embodiment)

Figure 8:
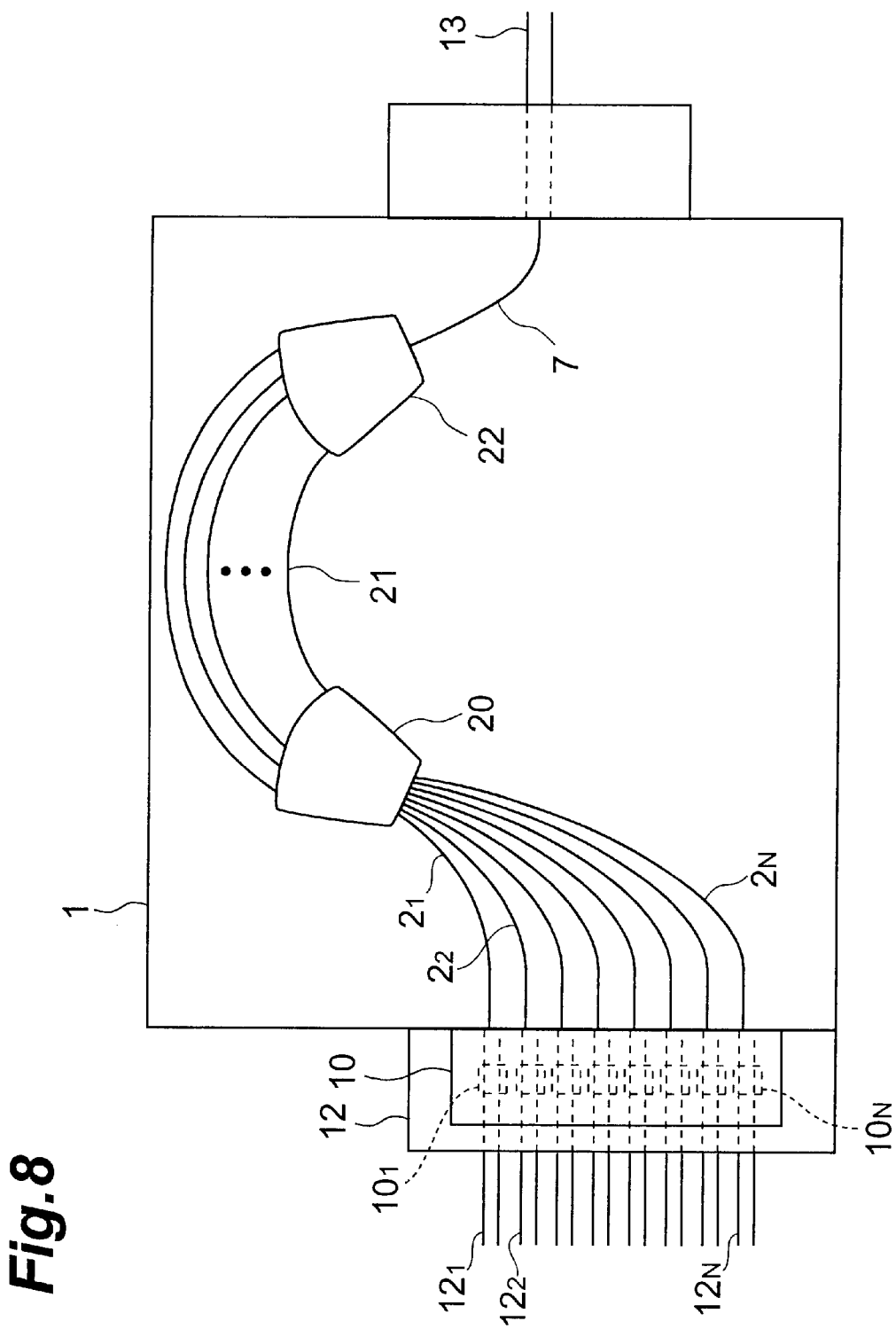

FIG. 8 is a plan view of the PLC module of the fourth embodiment according to the present invention.

This PLC module has an AWG, serving as an optical multiplexer, as a PLC. This PLC consists of input optical waveguides $2_1$ to $2_N$, a slab waveguide 20, an array waveguide portion 21, a slab waveguide 22, and an output optical waveguide 7 on a substrate 1, and has N input ports and one output port. This PLC module further comprises of a photodetector array 10 having N arrayed photodetectors $10_1$ to $10_N$, an input optical fiber array 12 having N arrayed input optical fiber $12_1$ to $12_N$, and one output optical fiber 13.

The slab waveguide 20 diffracts a signal light beam having a wavelength $\lambda_n$ and input from the input optical waveguide $2_n$, and guides it to come incident on a plurality of optical waveguides constituting the array waveguide portion 21. The slab waveguide 22 diffracts signal light beams input from the array waveguide portion 21, and guides them to come incident on the output optical waveguide 7. The array waveguide portion 21 formed between the slab waveguides 20 and 22 is comprised of the plurality of optical waveguides. These plurality of optical waveguides have optical path lengths that are different from each other by a predetermined value, to phase-shift the light beams being guided in them. The sectional arrangement near the input ports of this PLC module is identical to that shown in FIG. 6.

This PLC module operates in the following manner. A signal light beam having a wavelength $\lambda_n$ emitted from the corresponding input optical fiber $12_n$ is partly reflected by the junction face between the input optical waveguide $2_n$ at a predetermined reflectance. The beam thus reflected reaches a photodetector $10_n$, and its power is detected by the photodetector $10_n$. By detecting the power of the thus reflected beam, the power of the signal light beam of each wavelength to be input from the input optical waveguide $12_n$ to the input optical fiber $2_n$ can be monitored accurately.

A signal light beam transmitted through the end face of the input optical waveguide $2_n$ is guided in the input optical waveguide $2_n$, and is input to the slab waveguide 20. The signal light beam input to the slab waveguide 20 is guided toward the array waveguide portion 21 while being diffracted. The respective wavelength components of the signal light beam input to the array waveguide portion 21 are guided through all the plurality of optical waveguides of the array waveguide portion 21, and are input to the slab waveguide 22. The respective wavelength components of the signal light beam are guided toward the output optical waveguide 7 while being diffracted in the slab waveguide 22.

In this case, since the plurality of optical waveguides of the array waveguide portion 21 have optical lengths that are different from each other by the predetermined value, the signal light beams guided in them are phase-shifted in accordance with their wavelengths. When these signal light beams are guided through the array waveguide portion 21 and slab waveguide 22 and come incident on the output optical waveguide 7, signal light beams of the respective wavelengths are multiplexed, and the resultant multiplexed signal light beam is output to the output optical waveguide 7. The signal light beam output to the output optical waveguide 7 comes incident on the output optical fiber 13.

As described above, the PLC module according to this embodiment has same advantages as the first to third embodiments.

(Fifth Embodiment)

Figure 9:
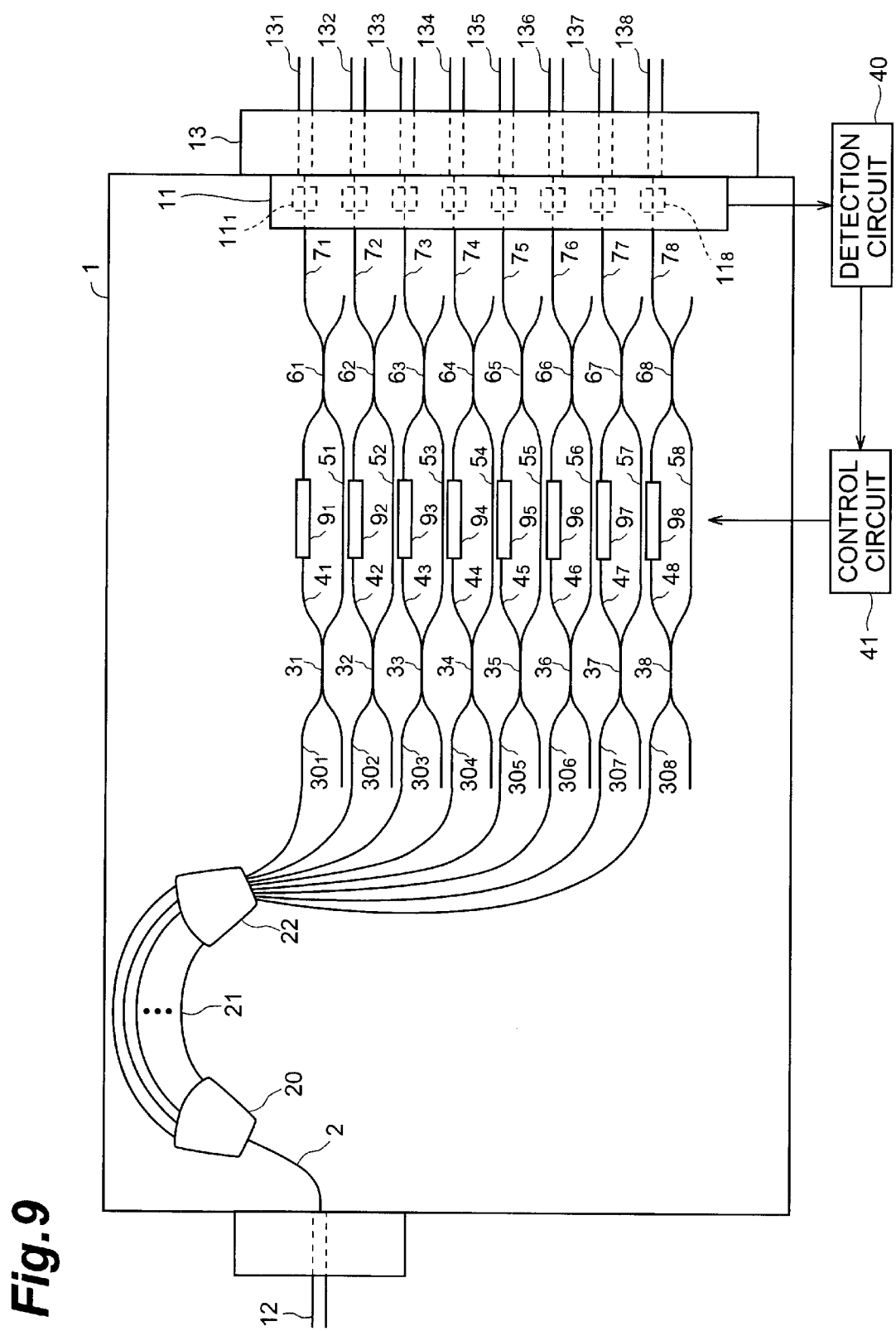

FIG. 9 is a plan view of a PLC module of the fifth embodiment according to the present invention. The PLC of this PLC module comprises of an AWG as serving as an optical demultiplexer of the third embodiment, and a multi-channel optical variable attenuator provided to the output of the AWG of the first embodiment.

An output-side slab waveguide 22 of the AWG and directional couplers $3_n$ of the multi-channel optical variable attenuator are connected to each other via optical waveguides $30_n$ (n=1 to 8). The sectional arrangement near the output ports of this PLC module is identical to that shown in FIG. 2. In this embodiment, the PLC module also has a detection circuit 40 and control circuit 41. The detection circuit 40 receives output electrical signals from photodetectors $11_1$ to $11_8$ in the photodetector array 11. The control circuit 41 controls the temperatures of heaters $9_1$ to $9_8$.

This PLC module operates in the following manner. A multi-wavelength signal light beam input from an input optical fiber 12 to an input optical waveguide 2 is demultiplexed into signal light beams of wavelengths $\lambda_n$ by the optical demultiplexing function of the AWG including a slab waveguide 20, an array waveguide portion 21, and the slab waveguide 22, and the signal light beams having the wavelengths $\lambda_n$ are output to the optical wavelengths $30_n$. The signal light beams having the wavelengths $\lambda_n$ are attenuated by the optical variable attenuator including the directional couplers $3_n$, optical waveguides $4_n$, optical waveguides $5_n$, directional couplers $6_n$, and the heaters $9_n$. The attenuated signal light beams are output to output optical waveguides $7_n$.

The signal light beams output to the optical waveguides $7_n$ are reflected by the junction faces between the output optical fibers $13_n$ at a predetermined reflectance. The beams thus reflected are guided toward the corresponding photodetectors $11_n$. The signal light beams transmitted through the junction faces between the output optical fibers $13_n$ pass through corresponding output optical fibers $13_n$.

The photodetectors $11_n$ output the electrical signals in response to the powers of the incident beams and the detection circuit 40 detected these powers from these electrical signal. The control circuit 41 controls the optical path lengths of the optical waveguides $4_n$ by heating them with heaters $9_n$. Therefore, the powers of the signal light beams having the wavelength $\lambda_n$ and output to the output optical waveguides $7_n$ can be feedback-controlled. Also, the powers of the signal light beams having the wavelengths $\lambda_n$ and to be output from the output optical waveguides $7_n$ to the output optical fibers $13_n$ (n=1 to 8) can be set equal to each other.

As described above, the PLC module of this embodiment has same advantages as any aforementioned embodiments.

(Sixth Embodiment)

Figure 10:
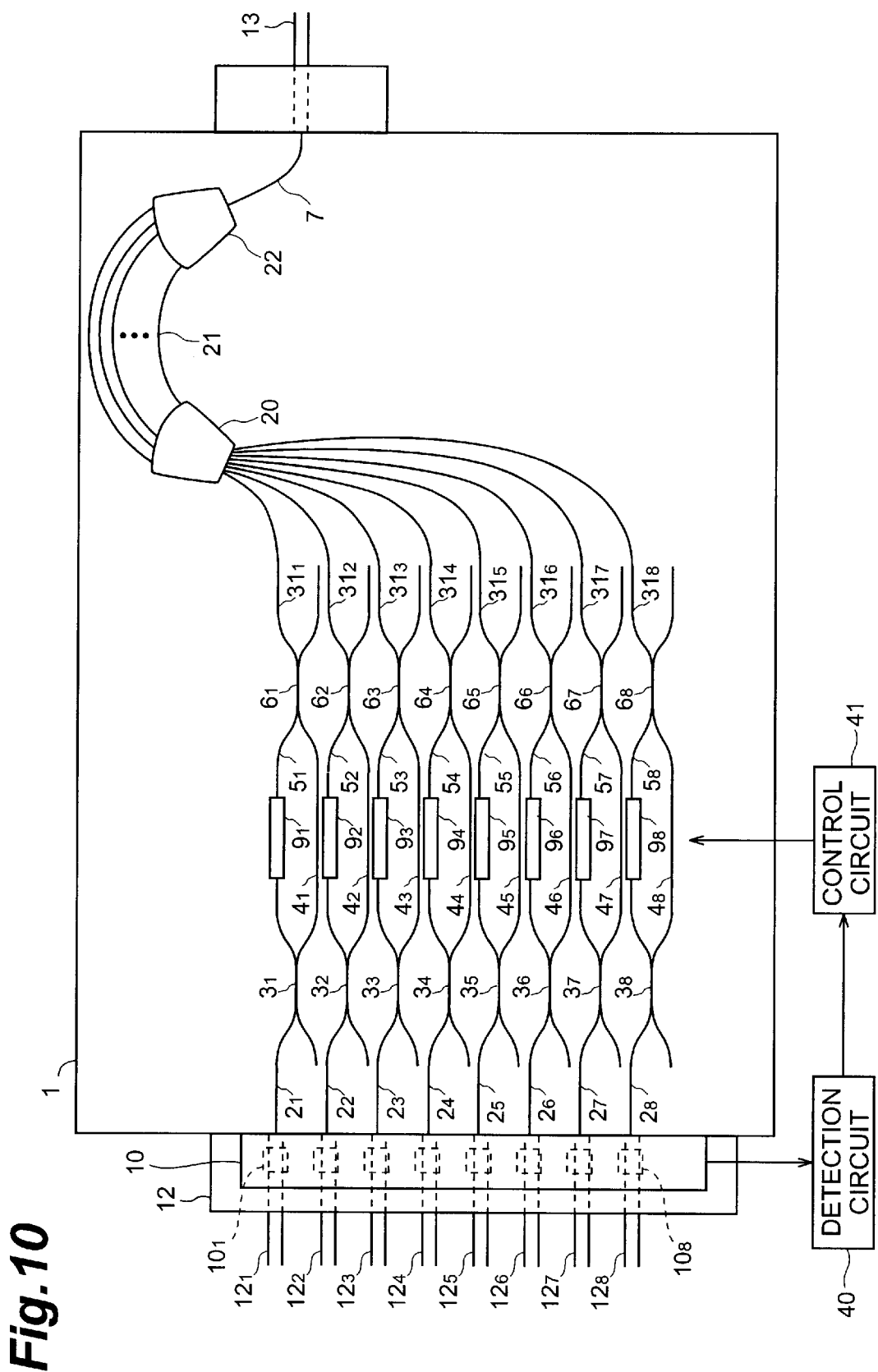
Figure 11:
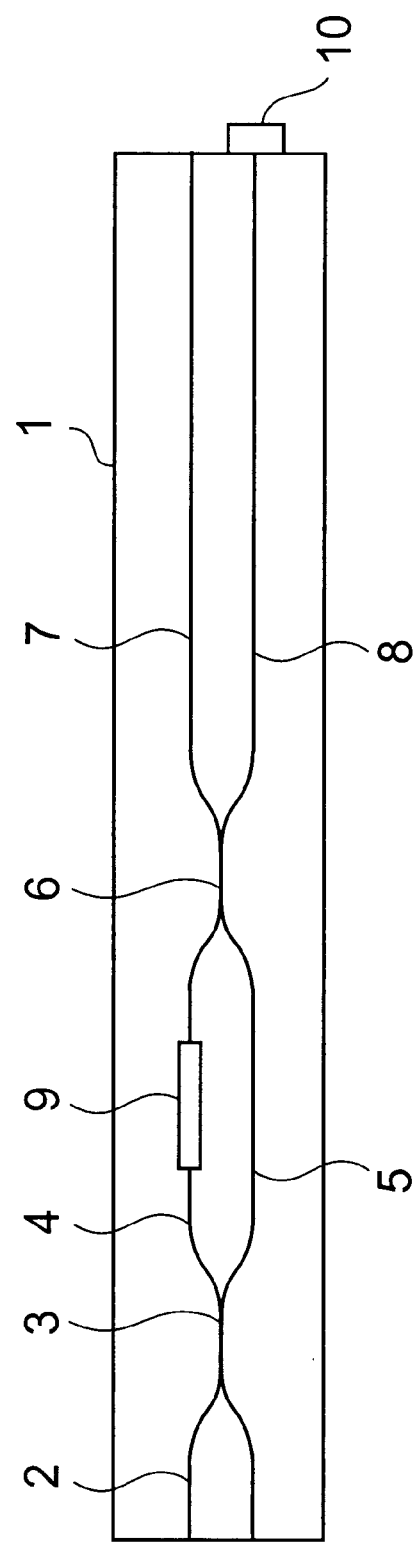
FIG. 11 is a view showing an arrangement corresponding to one channel of a conventional multi-channel optical variable attenuator using a Mach-Zehnder type optical waveguide.

FIG. 10 is a plan view of the PLC module of the sixth embodiment according to the present invention. The PLC of this PLC module comprises of a multi-channel optical variable attenuator of the first embodiment and an AWG, connected to the output of the multi-channel optical variable attenuator and serving as an optical multiplexer of a fourth embodiment.

Directional couplers $6_n$ of the multi-channel optical variable attenuator and an input-side slab waveguide 20 of the AWG are connected to each other through optical waveguides $31_n$ (n=1 to 8). The sectional arrangement near the input ports of the PLC module according to this embodiment is identical to that shown in FIG. 6. In this embodiment, the PLC module also has a detection circuit 40 and control circuit 41. The detection circuit 40 receives electrical signals output from photodetectors $10_1$ to $10_n$ in the photodetector array 10. The control circuit 41 controls the temperatures of heaters $9_1$ to $9_8$.

This PLC module operates in the following manner. Signal light beams having a wavelength $\lambda_n$ pass through input optical fibers $12_n$ are reflected by the junction faces between input optical waveguides $2_n$ at a predetermined reflectance. The beams thus reflected are guided toward the photodetectors $10_n$. The photodetectors $10_n$ output the electrical signals in response to the powers of the incident beams and the detection circuit 40 detected these powers from these electrical signal. The signal light beams transmitted through the junction faces pass through the input optical waveguides $2_n$ and are attenuated by the optical variable attenuator including directional couplers $3_n$, optical waveguides $4_n$, optical waveguides $5_n$, the directional couplers $6_n$, and the heaters $9_n$. The attenuated signal light beams are output to the optical waveguides $31_n$. The signal light beams having the wavelength $\lambda_n$ are multiplexed by the photomultiplexing function of the AWG including the slab waveguide 20, an array waveguide portion 21, and a slab waveguide 22. The resultant multiplexed signal light beam is output to an output optical fiber 13 through an output optical waveguide 7.

If the insertion loss of each wavelength $\lambda_n$ between the input optical fibers $12_n$ and the output optical fiber 13 is known, the power of the output signal light component having the wavelength $\lambda_n$ can be feedforward-controlled by controlling the optical path lengths of the optical waveguides $4_n$ based on the detected power of corresponding reflected beam. For example, the powers of components in the multiplexed beam output to the output optical fiber 13 can be set equal to each other.

As described above, the PLC module according to this embodiment has same advantages as the first to third embodiments.

The present invention is not limited to the above embodiments, but can be modified in various manners. For example, the PLC is not limited to a multi-channel optical variable attenuator or AWG, but can be any other optical circuit.

What is claimed is:

1. A planar lightwave circuit (PLC) module comprising:
   a planar lightwave circuit (PLC) provided with many waveguides including a plurality of output optical waveguide on a substrate, said PLC having a multi-channel optical variable attenuator, wherein
   output end faces of the output optical waveguides are slant against the optical axis thereof;
   an output optical fiber array including output optical fibers each coupled to corresponding output optical waveguides;
   a reflecting film deposited on output end faces of said output optical waveguides or input end faces of said output optical fibers; and
   a photodetector array including photodetectors each located in the surface of said PLC and opposed to the corresponding reflecting films for detecting reflected light by corresponding said reflecting films.

2. A PLC module according to claim 1, wherein each slant angle of said output end faces of said output optical waveguides is from 45 to 70 degrees.

3. A PLC module according to claim 1, further comprising light-transmitting resin layer disposed between the surface of said PLC and said photodetectors.

4. A PLC module according to claim 1, wherein said reflecting film is a dielectric multi-layer film.

5. A PLC module according to claim 1, wherein said PLC has an optical demultiplexer.

6. A PLC module according to claim 1, wherein said PLC has an optical demultiplexer on an input stage of said multi-channel optical variable attenuator.

7. A planar lightwave circuit (PLC) module comprising:
   a planar lightwave circuit (PLC) provided with many waveguides including a plurality of input optical waveguide on a substrate, said PLC having a multi-channel optical variable attenuator, wherein
   input end faces of the input optical waveguides are slant against the optical axis thereof;
   an input optical fiber array including input optical fibers each coupled to corresponding input optical waveguides;
   a reflecting film deposited on input end faces of said input optical waveguides or output end faces of said input optical fibers; and
   a photodetector array including photodetectors each located on said input optical array and opposed to corresponding reflecting films for detecting reflected light by corresponding said reflecting films.

8. A PLC module according to claim 7, wherein each slant angle of said input end faces of said input optical waveguides is from 45 to 70 degrees.

9. A PLC module according to claim 7, further comprising light-transmitting resin layer disposed between the surface of said input optical fiber array and said photodetectors.

10. A PLC module according to claim 7, wherein said reflecting film is a dielectric multi-layer film.

11. A PLC module according to claim 7, wherein said PLC has an optical demultiplexer on an output stage of said multi-channel optical variable attenuator.

12. A PLC module according to claim 1, wherein the reflectance of said reflecting film is 3% to 20%.

13. A PLC module according to claim 7, wherein the reflectance of said reflecting film is 3% to 20%.

* * * * *